April 4, 1961
J. L. HALSMER
2,978,208
TWIN-ENGINE ARRANGEMENT
Filed July 9, 1956
3 Sheets-Sheet 1
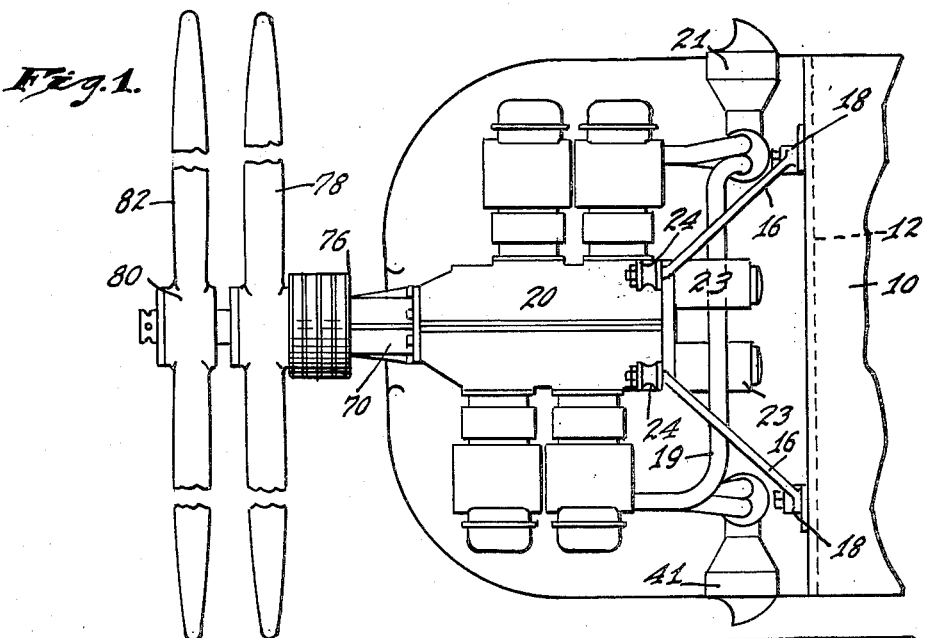
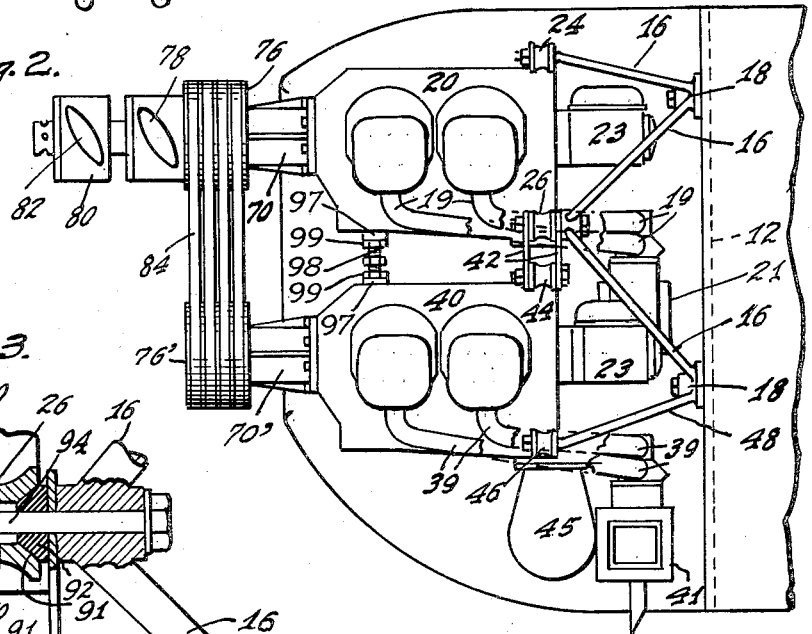
INVENTOR.
JOSEPH L. HALSMER
BY
*Schley, Lash & Jenkins*
ATTORNEYS.

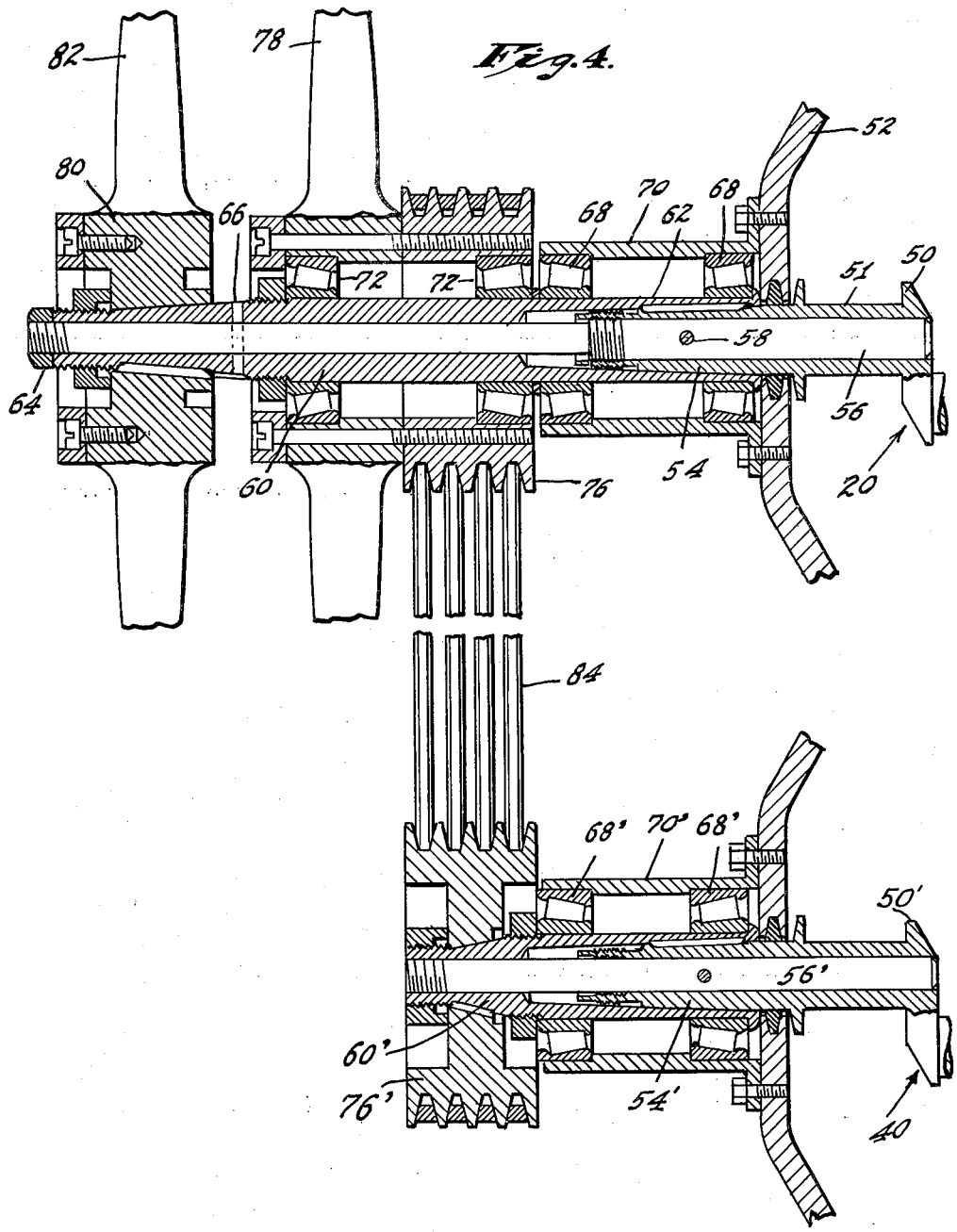

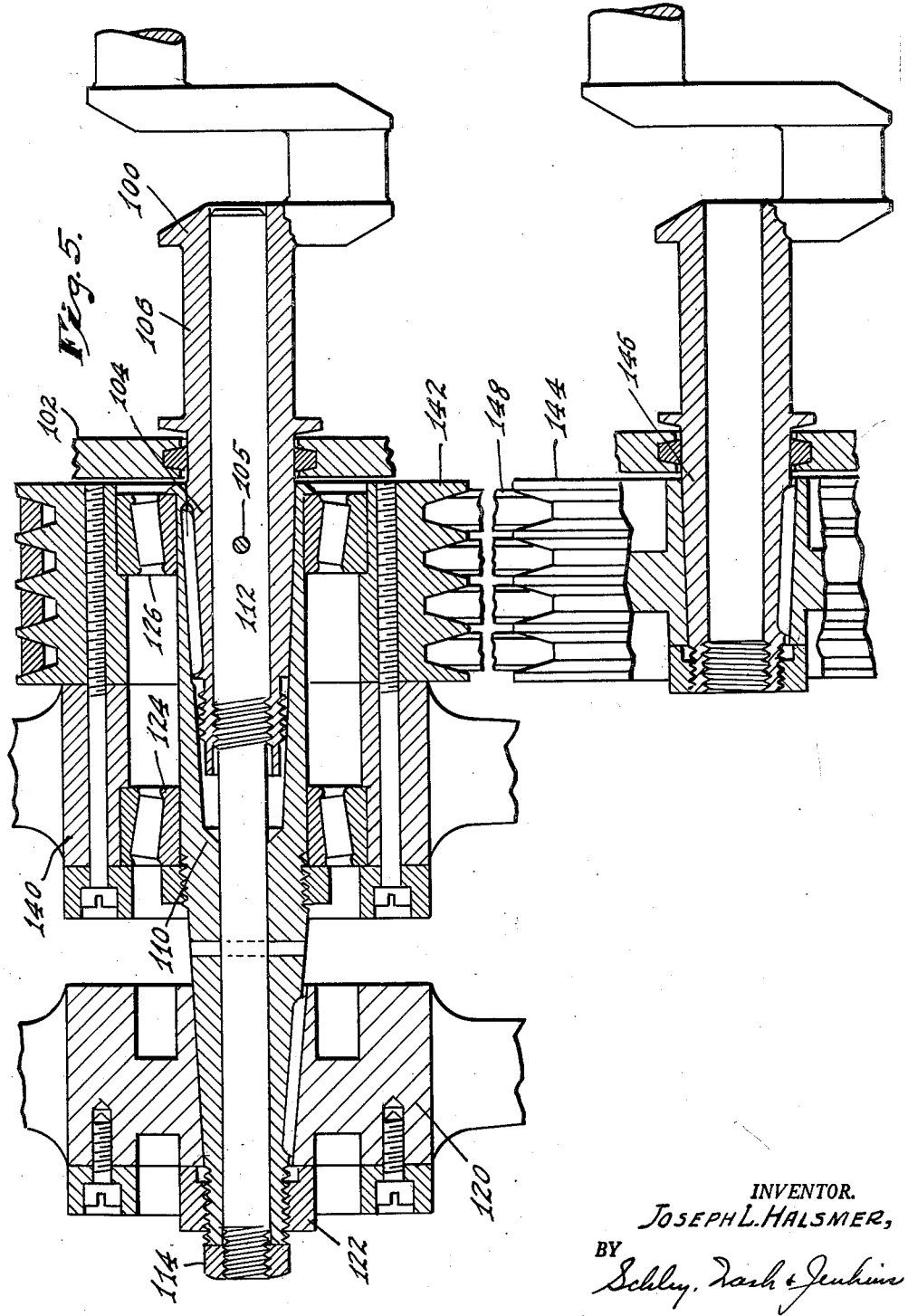

2,978,208
TWIN-ENGINE ARRANGEMENT
Joseph L. Halsmer, Rte. 5, Lafayette, Ind.
Filed July 9, 1956, Ser. No. 596,769
2 Claims. (Cl. 244—53)

This invention relates to aircraft propulsion, and especially to a twin engine and propeller arrangement adapted to be mounted at the front of the fuselage of an aircraft.

It is the general object of the invention to provide increased power and safety for aircraft, especially for smaller aircraft of the type in which the power plant is mounted at the front of the fuselage. It is a special object of the invention to provide a compact dual-engine and propeller arrangement which may be mounted in a single housing or nacelle, as at the front of the fuselage, and may be used either as standard equipment for the aircraft or may replace the single engine of a single-engine aircraft. It is an object of the invention to provide a two-engine power plant in which the two engines drive separate propellers mounted coaxially and rotating in the same directions, and in which the two engines and propellers may be operated either separately or together, as desired.

In accordance with the invention two engines of the horizontally opposed type are mounted one above the other, in a compact closely spaced relationship, and are connected to drive separate propellers mounted for independent rotation on a common axis. The propeller axis will of course be off-set from at least one of the engines, and the propeller driven from such engine will be connected thereto by an offset drive, preferably a multiple-V-belt drive. In a preferred embodiment of the invention, a first engine is mounted in the usual position of a single engine at the front of the fuselage, as by means of conventional mounting brackets carried by the fire wall of the aircraft fuselage. The engine is desirably of the type referred to as a horizontally-opposed, or flat, engine, in which opposite banks of cylinders extend substantially horizontally from opposite sides of the crank case. A second similar engine is mounted closely below the first engine. The shaft of the first engine is extended forward, and carries a first propeller at its front end. Between the first propeller and its engine, a sleeve carrying a second propeller is rotatably mounted coaxially with the shaft of the first engine, as by being mounted on such shaft by suitable bearings; and the second propeller is arranged to be driven from the second engine. Desirably, the sleeve carrying the second propeller is driven from the second engine by belt means, preferably a plurality of narrow V-belts connecting two multiple-groove pulleys carried respectively by the second engine and the sleeve on which the second propeller is mounted.

The second engine may be supported from the first, preferably by a relatively flexible support at the rear and at least in part by the belts at the front. Means such as an adjustable strut between the engines is provided to maintain the belts tight.

In the preferred arrangement, the pulleys and propellers are spaced forward from the engines, and the intervening engine shafts are preferably supported by nose bearings in addition to the front crank-shaft bearings.

Any of a number of different makes of engines of the horizontal opposed type may be used in my dual engine arrangement. The arrangement puts the second engine closely beneath the first, to give compact relationship, and the compactness may be facilitated by relocation of accessory components of the two engines, and in some cases by inverting the top engine. The engines of the two-engine combination may be individually smaller than the single engine normally used on the aircraft. For example, an 150 H.P. single-engine may be replaced by a pair of 95 H.P. engines.

In operation, the two propellers rotate in the same direction, and are respectively driven independently by the two engines. Either engine may be operated alone to drive its propeller while the other engine and propeller are at rest, and will provide the full power of the single-engine in use. For maximum power, the two engines and their propellers may be operated together, and in such case the two propellers tend to rotate in synchronism, with the rear propeller taking a position slightly behind the front propeller. Either fixed or adjustable-pitch propellers may be used, and where a fixed-pitch propeller is used, the rear propeller may have a slightly greater pitch than the front propeller.

The accompanying drawings illustrate the invention. In such drawings:

Fig. 1 is a top plan view of an engine installation embodying the invention;

Fig. 2 is a side elevation of the arrangement shown in Fig. 1;

Fig. 3 is an enlarged fragmentary view showing a bracket for interconnecting the two engines;

Fig. 4 is a sectional view taken on the axes of the two engine shafts, showing the drive and bearings for the two propellers; and Fig. 5 is a view similar to Fig. 4, but showing a modification.

In the apparatus shown in the drawings, the air craft fuselage 10 is closed at the front by a fire wall 12 which forms a structural support for mounting two engines 20 and 40. The mounting for the top engine 20 is of conventional form and consists of a group of angularly disposed struts 16 supported from mounting pads 18 on the fire wall 12 and supporting mounting studs engaged by mounting ears 24 and 26 on the crank case of the top engine 20. The top engine is thus mounted in the normal position of the engine of a single-engine installation.

The second engine 40 is mounted below the first engine 20, by means which will be more fully described below and which includes a pair of mounting plates 42 extending between the bottom mounting ears 26 of the top engine 20 and the top mounting ears 44 of the bottom engine 40, and which may include a pair of supplemental struts 48 extending from the bottom mounting pads 18 to the bottom mounting ears 46 of the bottom engine.

The two engines 20 and 40 are basically conventional engines of the horizontally-opposed type. Each has a crank case, and as shown, each is a four-cylinder engine with opposite pairs of cylinders extending horizontally in opposite directions from the crank case. The bottom engine is mounted close below the top engine, and to facilitate this compact relationship, accessory components of the engines are relocated from their single-engine positions. For example, the carburetor 21 of the top engine is mounted behind the engines at the right of the fuselage, and the carburetor 41 of the bottom engine is mounted behind the engines at the left of the fuselage, and the intake ducts 19 and 39 are arranged to connect the carburetors to their respective engines. The magnetos 23 may remain in normal positions behind the engines. The oil sump 45 of the bottom engine 40 may remain in normal position below its engine, and that of the top engine may be moved rearward. Various rearrangements of accessory components can be used and will differ for different makes and models of engines. In any case, the two engines are mounted with the second close below the first and generally parallel therewith. The total frontal area of the assembly is very little greater than that of the single engine arrangement, and in any case substantially less than the cross-sectional area of the fuselage at the fire wall.

At least the top engine, and preferably both engines, are provided with forwardly extended shafts. The forward extensions may be integral parts of the crank shafts provided in the engines, or may be provided by shaft extensions secured to the normal-length standard crank shafts of the engines.

In the preferred modification shown in Figs. 1, 2, and 4, both engines are provided with shaft extensions.

As shown in Fig. 4, the stock crank shaft 50 of the top engine includes a front journal 51 positioned inside the crank case 52 and supported therein by the usual main bearing (not shown). From the journal 51, the crank shaft extends forward through the crank case and provides a tapered shaft-end 54. The journal 51 and the tapered end 54 are hollow, and the front of the tapered end 54 is provided with both internal and external threads. For the purpose of securing a shaft extension on the crank shaft, a tie rod 56 is fitted into the hollow bore of the crank shaft with a sliding fit, and such rod 56 is provided with threads which take into the internal threads at the front of the shaft-end 54. Preferably, the rod 56 is secured in threaded engagement with the crank shaft by a pin 58.

A shaft extension 60 is fitted over the forward end of the rod 56 and is provided at its rear with a tapered seat fitting the tapered mounting surface of the shaft-end 54. The tapered surfaces are desirably provided with key ways to receive a key 62 by which the extension 60 is locked against rotation on the shaft-end 54. The extension 60 is held in place on the shaft-end 54 by means of the rod 56, as with a nut 64 threaded onto the forward end of the rod 56 and bearing against the forward end of the extension 60. The parts may be additionally secured by means of a cross pin 66.

The rear portion of the shaft extension 60 carries, and is supported by, the inner races of a spaced pair of roller bearings 68, whose outer races are mounted in a nose bearing sleeve 70 fixed to the front of the crank case 52. The intermediate portion of the shaft extension 60 carries the inner races of a pair of roller bearings 72, whose outer races carry an assembly of a four-groove pulley 76 at the rear and a propeller 78 at the front. The front end of the shaft extension 60 is formed to provide a tapered mounting for the hub 80 of a front propeller 82.

The extended shaft on the top engine 20 is thus supported both by the standard front main bearing of the engine and by the added nose bearing 68—70. Its forward end carries the front propeller 82 which is driven directly by the top engine 20. Its intermediate portion, between the nose bearing 68—70 and the propeller 82 rotatably supports the propeller 78 and the multiple-groove pulley 76 by which that propeller 78 may be driven from the bottom engine 40.

The crank shaft 50' of the bottom engine is provided with a short extension in a manner similar to that of the top engine. A tie rod 56' is inserted in the hollow front section of the standard crank shaft 50', and this is used to secure a shaft extension 60' to the tapered front end 54' of the crank shaft. The shaft extension 60' is relatively shorter than the extension 60, for it need extend forward only sufficiently to support the four-groove pulley 76'. Its rear portion is rotatably mounted in a nose bearing 68' carried in a sleeve 70'. The two pulleys 76 and 76' are interconnected by four V-belts 84.

As has been noted, the bottom engine is mounted close below the top engine. With the belt drive, the mounting of the bottom engine should provide for belt adjustment, and may rely in part on the belts themselves for engine support.

In the engines shown, the mountings are of the type shown in Fig. 3. The mounting ear 26 is provided with a through hole 90 having a conical seat 91 at each end for the reception of a conical rubber insert 92. The rubber inserts 92 are compressed between the mounting ear and a pair of washers or plates on the supporting stud or bolt 94 carried by the mounting struts 16, and flexibly support the ear on such bolt. The top ears 44 of the bottom engine are mounted from the same studs 94 as the bottom ears 26 of the top engine. To this end, a pair of plates 42 are supported with the mounting ears 26 on their mounting studs 94. The two plates 42 extend downward to a position to receive between them the two mounting ears 44 at the top of the bottom engine 40, and such ears 44 are mounted to the plates 42, by rubber inserts 92 and bolts 96. This mounting provides a degree of flexibility, permitting the front of the bottom engine 40 to move downward, and the weight of the bottom engine 40 tends to maintain the desired belt tension. To maintain the bottom engine 40 in its desired tensioning position, an adjustable strut is positioned between the two engines adjacent the front of their crank cases. Such strut conveniently comprises end members 97 secured to the crank cases, and an oppositely threaded stud 98 threaded into such end members 97 and provided with lock nuts 99 to secure it in adjusted position. An additional stabilizing support for the bottom engine 40 may be provided by a pair of struts 48 extending between the bottom mounting pads 18 on the fire-wall and the bottom mounting ears 46 of the engine 40.

Fig. 5 shows a modification in which only the top engine has its shaft extended, and in which the extension is shorter than in the modification of Figs. 1–4.

The crank-shaft 100 of the top engine 102 has a hollow tapered stub 104 projecting forward through the crank case from its front journal section 106. To retain a shaft extension 110, the hollow shaft is fitted with a tie bolt 112 which fills the bore of the stub 104 and journal 106, and is threaded into the internal threads of the front of the stub 104, and which extends forward therefrom. A cross pin 105 locks the bolt 112 in the shaft. The hollow shaft extension 110 has a rear taper bore to seat on the tapered stub 104, and a front bore to fit the tie bolt 112. The tie bolt is threaded at the front to receive a nut 114 which is tightened against the shaft extension 110 to retain it in place.

The front end of the shaft extension 110 is tapered to receive the hub of a first propeller 120, retained thereon by a nut 122. The rear portion of the extension is formed to receive the inner races of a pair of roller bearings 124 and 126 which rotatably support an assembly of a second propeller 140 and a four-groove pulley 142 coaxially on the shaft.

The second engine, mounted closely below the first, has a driving pulley 144 mounted on its crank-shaft stub 146 in a position of parallel alignment with the pulley 142. Four V-belts 148 connect the pulleys 144 and 142, to drive the second propeller 140 from the second engine.

In both modifications, the two engines are compactly arranged in parallel, one above the other, to form a generally rectangular power package. This package is mounted in the place of a single engine, and is housed in a common housing. It provides additional power and flexibility and safety without materially increasing the frontal area of the aircraft or changing its flight characteristics. The two engines individually may be of somewhat lower rating than the single engine they would replace, but each sufficient to provide safe operation of the aircraft. Together, the two engines provide increased power both for cruising and for peak operation of the aircraft.

Normally, I prefer to operate both engines, and to run them at the same speeds. The two propellers rotate in the same direction, and tend to stay in synchronism, with the rear propeller slightly trailing the front propeller, and the two engines are readily adjusted to operate at synchronous speeds.

I claim as my invention:

1. An aircraft twin-engine power plant adapted for mounting in place of a single engine on the fire wall of an aircraft, comprising a top horizontally-opposed engine having top and bottom mounting ears adjacent the rear of the crank case thereof, mounting studs supported from the aircraft and receiving said top and bottom ears to support the same and the top engine in forwardly projecting position with its axis disposed longitudinally of the aircraft substantially in the central plane of the fire wall, bracket means supported with said bottom ears from said mounting-studs, a bottom horizontally-opposed engine having top mounting ears adjacent the rear of the crank case thereof and connected to said bracket means to support the rear of the bottom engine with the rear of the top engine, the bottom engine being positioned in forwardly-extending substantially parallel close proximity directly below the top engine, strut means controlling the front spacing between the engines, a drive shaft extending forward co-axially with the top engine and driven thereby, a first propeller carried by said drive shaft, an independently rotatable second propeller and pulley assembly mounted co-axially with said drive shaft between said first propeller and said one engine, a drive shaft extending forward of and driven by the bottom engine, a pulley carried by said last-named drive shaft, and belt means connecting said pulley to connect said bottom engine to drive said second propeller in the same direction of rotation as said first propeller, said two engines and said two propellers being of similar size and characteristics for operation with the propellers rotating together in synchronism.

2. An aircraft twin-engine power plant according to claim 1 in which said pulleys are multiple sheave pulleys and said belt means consists of a plurality of narrow belts engaged in said sheaves, and in which the front of the lower engine is at least in part supported from the top engine by said belt means, and said strut means acts between said engines ahead of the said rear mounting ears.

References Cited in the file of this patent

UNITED STATES PATENTS

| 1,324,029 | Bouche | Dec. 9, 1919 |
| 1,394,870 | Thomas | Oct. 25, 1921 |
| 1,437,265 | Oriol | Nov. 28, 1922 |
| 1,920,444 | Thoen | Aug. 1, 1933 |
| 2,053,078 | Hathorn | Sept. 1, 1936 |
| 2,305,454 | Nallinger | Dec. 15, 1942 |
| 2,310,220 | De Michelis | Feb. 9, 1943 |
| 2,539,960 | Marchant et al. | Jan. 30, 1951 |

FOREIGN PATENTS

| 27,800 | Great Britain | Mar. 21, 1912 |